United States Patent
Stadler et al.

(10) Patent No.: US 7,203,341 B2
(45) Date of Patent: Apr. 10, 2007

(54) METHOD FOR GENERATING AND STORING PICTURE DATA IN COMPRESSED AND DECOMPRESSED FORMAT FOR USE IN TRAFFIC MONITORING

(75) Inventors: Torsten Stadler, Salzgitter (DE); Hans-Holger Kuester, Alfeld (DE)

(73) Assignee: Robot Foto und Electronic GmbH, Dusseldorf (DE)

(*) Notice: Subject to any disclaimer, the term of this patent is extended or adjusted under 35 U.S.C. 154(b) by 0 days.

(21) Appl. No.: 11/198,516

(22) Filed: Aug. 5, 2005

(65) Prior Publication Data

US 2006/0018510 A1    Jan. 26, 2006

Related U.S. Application Data

(63) Continuation of application No. 09/737,655, filed on Dec. 15, 2000, now abandoned.

(30) Foreign Application Priority Data

Dec. 17, 1999  (DE) ................................ 199 60 887

(51) Int. Cl.
*G06K 9/00* (2006.01)
*G06K 9/36* (2006.01)
*G08G 1/095* (2006.01)

(52) U.S. Cl. ........................ 382/104; 382/239; 340/907

(58) Field of Classification Search .................... None
See application file for complete search history.

(56) References Cited

U.S. PATENT DOCUMENTS

| 5,933,249 A | * | 8/1999 | Shimura et al. | ............ 382/239 |
| 5,948,038 A | * | 9/1999 | Daly et al. | .................. 701/117 |
| 6,075,559 A | * | 6/2000 | Harada | ........................ 348/148 |
| 2003/0011597 A1 | * | 1/2003 | Oizumi | ........................ 345/427 |
| 2006/0157012 A1 | * | 7/2006 | Kanno | ..................... 123/90.17 |

* cited by examiner

*Primary Examiner*—Jingge Wu
*Assistant Examiner*—Charles Kim
(74) *Attorney, Agent, or Firm*—Lawrence G. Fridman

(57) ABSTRACT

The invention relates to a device for data storing with a compression coding and/or decoding device for the storing of picture data in a compressed or decompressed data format in a data memory. The compression coding and decoding device is adapted to mark or label and subsequently specific retrieve picture segments. This permits individual compression or decompression of labelled picture segments. In a method of storing picture data in a compressed or decompressed data format in a data storing memory, the picture data are divided into data segments. The location information of the data segments is stored. The method and device is preferably used in traffic monitoring installations. The picture data are camera data of a digital camera taking pictures of a traffic situation and a violating vehicle, when traffic regulations are violated such as by speeding. The device and method of the invention permits, for example, to decompress individually the picture segment showing the license plate of a violating vehicle.

3 Claims, 4 Drawing Sheets

METHOD FOR GENERATING AND STORING PICTURE DATA IN COMPRESSED AND DECOMPRESSED FORMAT FOR USE IN TRAFFIC MONITORING

This application is a continuation of U.S. patent application Ser. No. 09/737,655 filed Dec. 15, 2000 now abandoned which is currently pending and claims priority of GERMAN PATENT APPLICATION S.N. 199 60 887.3 filed Dec. 17, 1999.

BACKGROUND OF THE INVENTION

The invention relates to a data storing device for the storing of picture data in a compressed or decompressed data format in a data memory, the data storing device having a compression coding and/or decoding device.

Furthermore the invention relates to a method for storing picture data in a compressed or decompressed data format in a data memory.

Traffic monitoring installations are used to detect traffic violations such as speeding or crossing a red traffic light. Such traffic monitoring installations take a picture of each violator or his car during the violation. Due to the high amount of violators, a large number of pictures have to be processed. Conventionally, the pictures are recorded on film negatives (see U.S. Pat. Nos. 3,849,784; 3,858,223; 3,866,165; 4,887,080; 5,041,828). The operator is often faced with large quantities of films, which are difficult to process and evaluate.

In order to facilitate processing of the pictures, digital cameras have been used in such traffic monitoring installations (see U.S. Pat. No. 5,948,038). Such digital cameras offer the advantage that the digital data can directly be processed. Such digital cameras do not require any film negative. Therefore, it is not necessary to develop a film. In addition, evaluating and processing of the data is facilitated. Further savings can be achieved by automating the writing and sending out of the violation tickets. Nevertheless, also such traffic monitoring installations have capacity limits with respect to the quantity of pictures to be stored and processed.

It is known to reflect information onto the film negatives (U.S. Pat. No. 3,603,227; U.S. Pat. No. 4,988,994). In a corresponding way digital information blocks are added to the digital pictures, for example information about time and date.

In the art of digital picture processing, various methods of picture compression are known. Compression formats are known, in which a picture is compressed and the original state is restored, when the picture is decompressed.

Various methods are used for the compression of digital pictures. Examples of such methods are JPEG-, GIF, and TIF- formats, which are often used in the internet for the transmission of pictures. Such compression methods are mostly standardized, described in the respective literature and well known to a person skilled in the art. Examples of literature describing the various compression methods are: the book by Günther Born "Referenzhandbuch Dateiformate" Addison-Wesley publisher, $2^{nd}$ revised edition 1992, ISBN 2-89319-446-0/VVA-Nr. 563-00446-4; and the standard IS 10918-1 ITU-T.81). Therefore, these compression methods need not be described in detail. The compression methods are also successfully used in traffic monitoring installations with a digital camera, in order to reduce the quantity of data.

In all these compression methods, the entire digital picture is compressed and, accordingly, the entire picture is decompressed. The disadvantage thereof is that, always the entire picture has to be decompressed, even if only a certain section of the picture or a certain block of information is needed,. Consequently the procedure is very slow.

SUMMARY OF THE INVENTION

It is an object of the invention to provide a device and a method for picture compression which allows a quick retrieval of essential picture information for decompression while still having optimum compression of the picture data.

To this end, in a data storing device having a compression coding and/or decoding device for the storing of picture data in a compressed or decompressed data format in a data memory, the compression coding and/or decoding device includes means for labelling or marking data segments or blocks of information, and means for detecting such labelled or marked segments.

The invention is based on the discovery that quite often only specific picture segments of a compressed picture file or blocks of information are demanded for display or further processing and, thus, have to be decompressed. According to the basic concept of the invention, therefore, such segments or blocks are labelled or marked during the compression process. When the decompressed picture data of such segments are demanded, the labelled or marked segments can be detected and restored to their original state by a decompression process, while the remaining stored picture data need not be decompressed. This offers great advantages with respect to speed. The location information can be added to the compressed picture file, for example or stored in a separate file.

Preferably, the compression coding and decoding device is a programmed digital computer.

Advantageously, a picture generating unit is provided for the generation of digital picture data. The picture generating unit can be a digital camara, for example. It can also be a scanner which digitises an original picture and generates the corresponding picture data. The data storing device may be used in a traffic monitoring installation.

Often picture information is lost by the compression. It may be necessary, on one hand, to retain all picture information of certain selected picture segments. On the other hand, the picture data file should still consume as little memory space as possible. To this end, the different data segments may be compressed to a different degree or may not be compressed at all. By labelling or marking, certain picture areas can be determined which should not be compressed at all, or should be compressed to a lesser degree. From this compressed picture file individual data segments can be selected and decompressed if required.

DESCRIPTION OF THE PREFERRED EMBODIMENT

Figure 1:
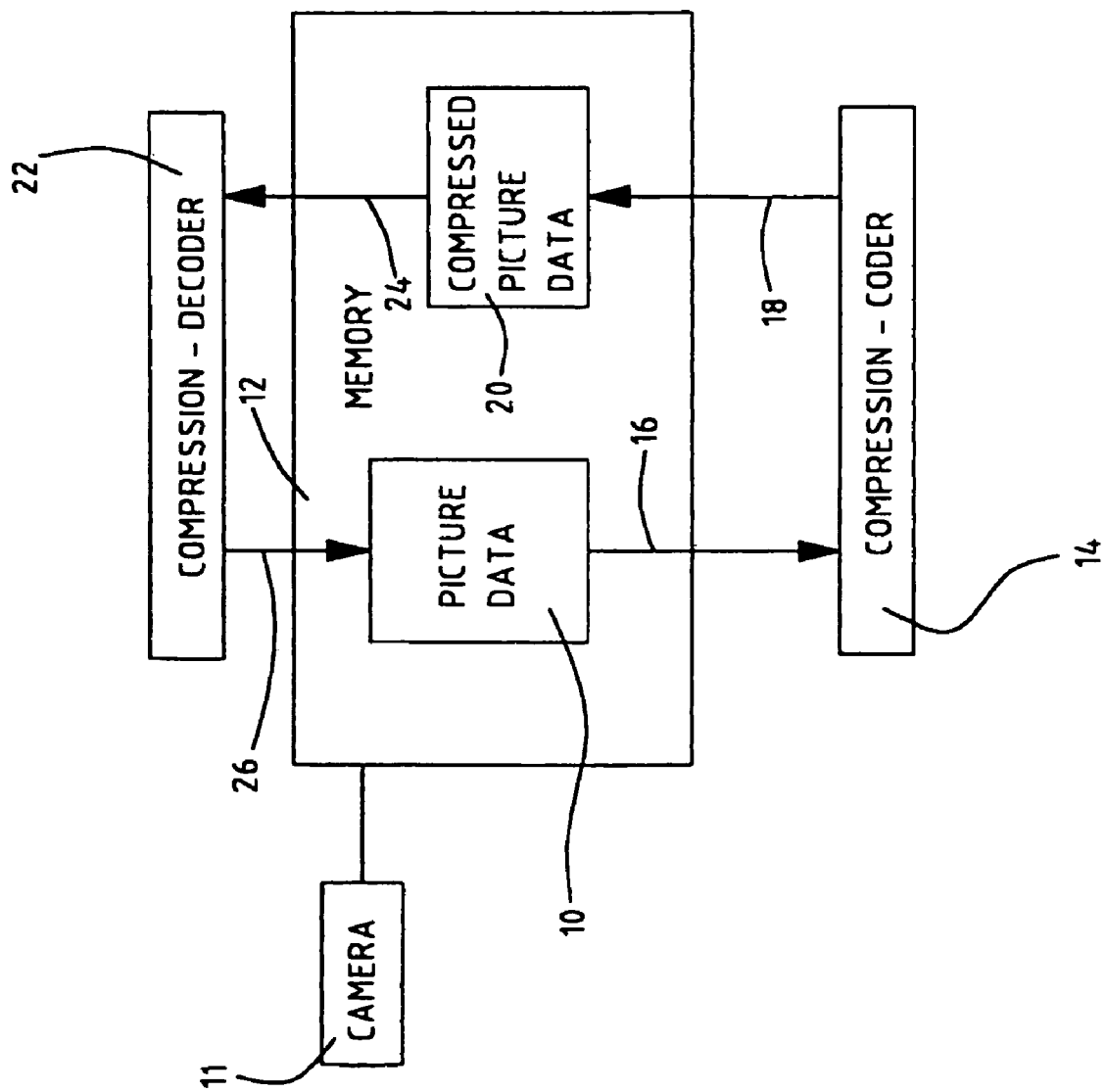
FIG. 1 is a schematic illustration of the basic principle of picture data compression and decompression according to the prior

FIG. 1 is a schematic illustration of the principle of picture data compression and decompression according to the prior art as used, for example, in traffic monitoring installations. Picture data 10 are stored in a memory 12 in the form of digital raw data from a digital camera 11. A compression coder 14 accesses the memory 12 and reads the picture data 10. The reading process is indicated by arrow 16. Then the read picture data 10 are compressed by compression coder 14, and the compressed picture data 20 are rewritten into the memory 12. The writing process into the memory is indicated by arrow 18. For the compression, one memory 12 can be used as in the illustration of FIG. 1; but it is also possible to use a plurality of separate memory areas.

For the display of the picture by means of a suitable peripheral display device accessing the memory, the compressed picture data 20 have to be decompressed. Therefore the compressed picture data 20 are read by a compression decoder 22. The reading process is indicated by arrow 24. After the decompression of the compressed picture data 20 by the compression decoder 22 the picture data are written back into the memory 12. The writing process of the decompressed picture data 10 into the memory 12 is indicated by arrow 26. The compression coder 14 or decoder 22 can be one unit, for example a program controlled processor.

Figure 2:
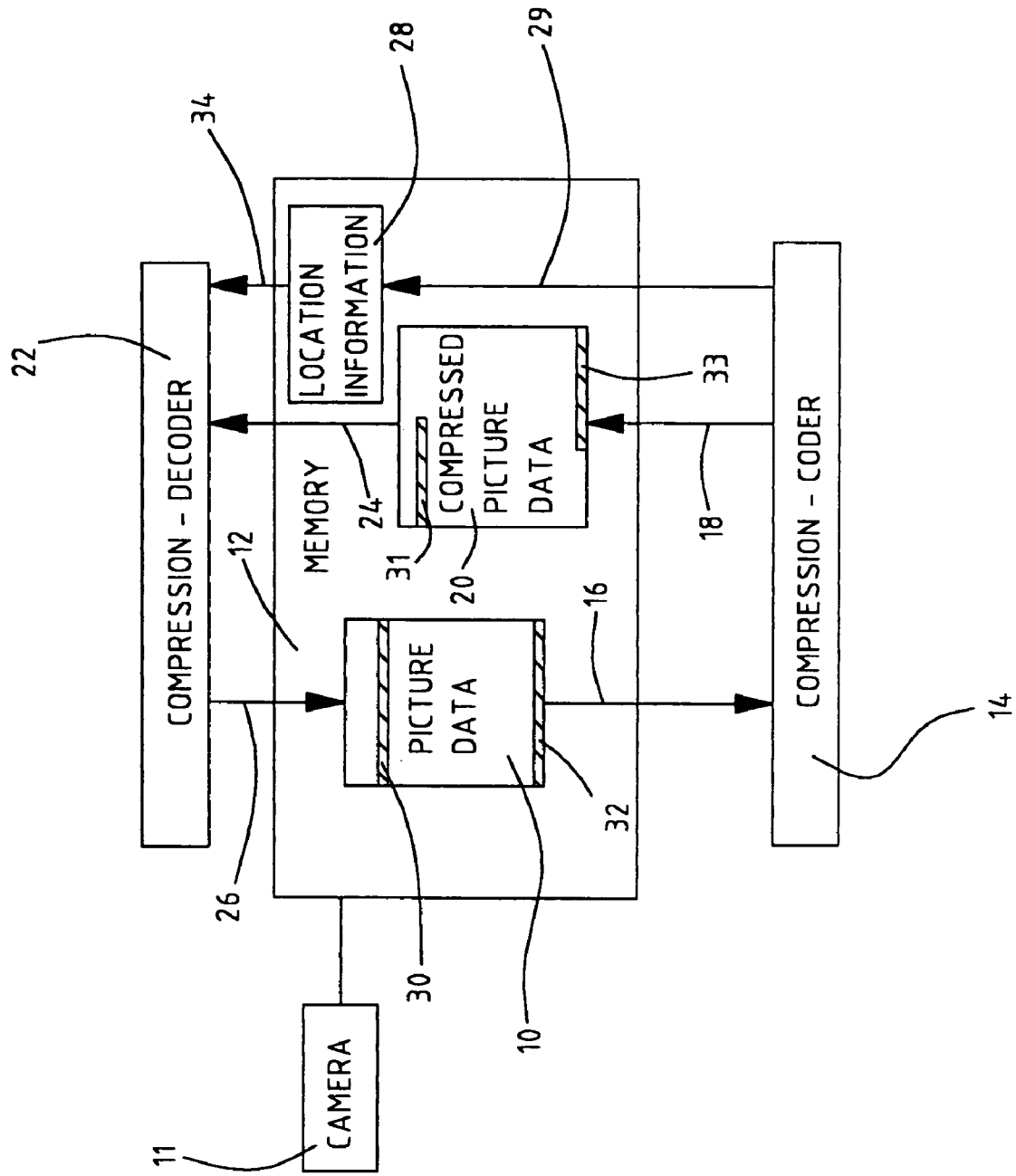
FIG. 2 is a schematic illustration of the principle of picture data compression and decompression with data segmentation of the invention.

FIG. 2 is a schematic illustration of the principle of picture data compression or decompression of the invention as used, for example, in a traffic monitoring installation. Similar to the prior art, the picture data 10 from, for example, a digital camera 11 are written into a memory 12 in the form of raw digital data. The compression coder 14 accesses the memory 12 and reads the picture data 10 for the compression process. The reading process is indicated by arrow 16. Then the read picture data 10 are divided into data segments by the compression coder 14 and labelled. These data segments are compressed and rewritten into the memory 12. The process of writing into the memory is indicated by arrow 18. The block 20 represents the compressed data segments of the picture data 10 in the memory 12. For example, data segments 30, 32 of the original picture 10 correspond to the compressed data segments 31 and 33. Additionally location information 28 for all data segments is written into the memory 12. In this embodiment, the location information 28 consists of labels, i.e. of information about the position of the respective data segments in the memory. The process of writing the location information 28 into the memory 12 by the compression coder 14 is indicated by arrow 29.

One single memory 12 as in FIG. 2 can be used for the compression process, but the use of a plurality of memory areas is also possible.

For displaying the picture by means of corresponding peripheral display devices the compressed picture data 20 have to be decompressed. Therefore, the compressed picture data 20 are read by a compression decoder 22. The reading process is indicated by arrow 24. After the decompression of the compressed picture data 20 by the compression decoder 22, the picture data are again written into the memory 12. The process of writing the decompressed picture data 10 into the memory 12 is indicated by arrow 26. The compression coder 14 and -decoder 22 can be one single unit, for example a program controlled processor.

Often, it is sufficient to display only certain picture areas or segments 30 or 32 of the entire picture 10. The compression decoder 22 then reads the location information 28 of the respective picture data segments and decompresses only those picture segments 30, 32. The reading process of the respective location information 28 is indicated by arrow 34. The decompressed data segments are then written into the memory 12. Thereby, it is not necessary to decompress the entire picture 20, if only the information from certain picture segments 30, 32 of the picture is required.

Figure 3:
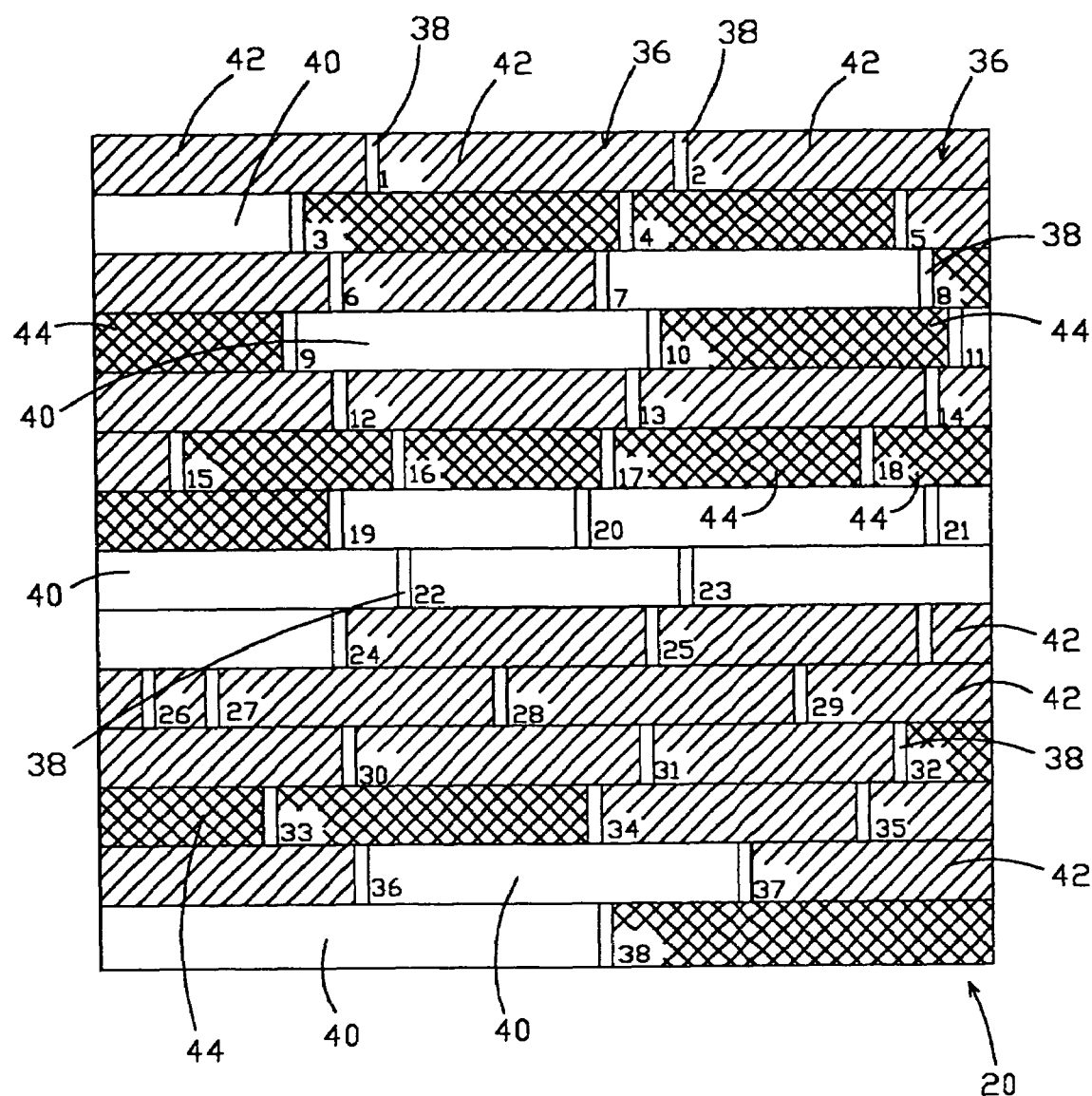
FIG. 3 a schematic illustration of a segmented digital picture with different degrees of compression

FIG. 3 shows a schematic drawing of the principle of a segmented digital picture 20, as stored in the memory 12 after compression to different degrees of compression. The data segments 36 are separated in this illustration by double lines 38 which also symbolise the labels of the data segments 36. The labels 38 are numbered. The data segments 36 are compressed to a different degree. The non-hatched data segments 40 are not compressed at all, the hatched data segments are slightly compressed and the cross-hatched data segments are heavily compressed.

Figure 4:
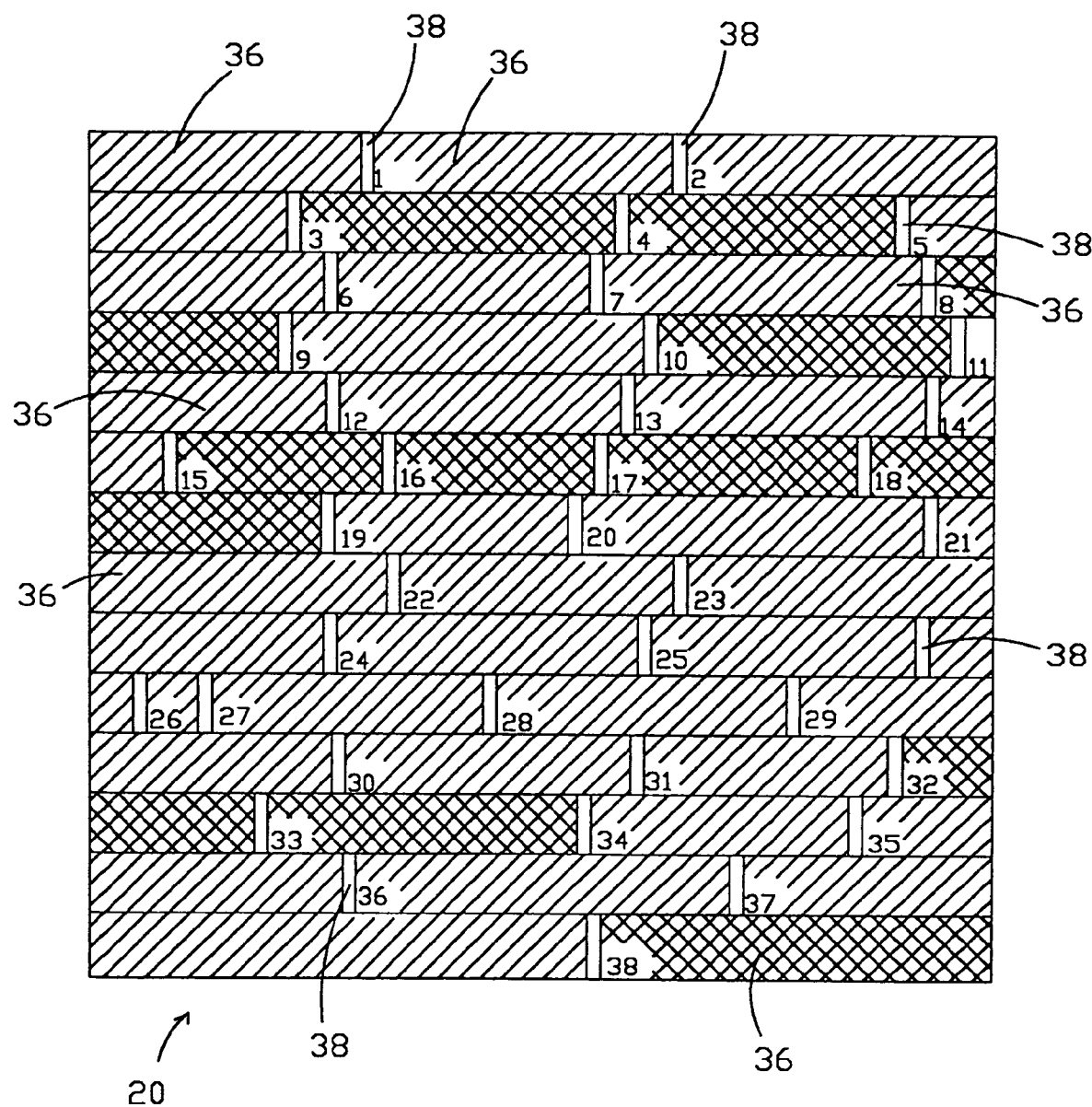
FIG. 4 is a schematic illustration of a segmented digital picture with a uniform degree of compression

FIG. 4 is a schematic drawing of a segmented digital picture 20, as stored in the memory 12 after compression. Contrary to FIG. 3, this picture is compressed to a uniform degree of compression. The data segments 36 are separated in this illustration by double lines 38 which also symbolise the labels of the data segments 36. The labels 38 are numbered. The data segments are uniformly compressed as indicated by simple hatching.

We claim:

1. A method of generating and storing picture data representing a traffic scene in a compressed and decompressed format in a data storing memory of a traffic monitoring arrangement having a digital camera, said method comprising the steps of:

generating a picture of a traffic scene by means of said digital camera of the traffic monitoring arrangement, so as to generate uncompressed picture data representing said traffic scene;

dividing said uncompressed picture data of the traffic scene into a plurality of data segments, so as to designate in said uncompressed picture data a location of at least one area of the traffic scene as a compression segment and a location of at least one other designated area of the traffic scene as a minimal or non-compression segment;

storing said uncompressed picture data including the designated traffic scene and compression information for each said designated area in the data storing memory of the traffic monitoring arrangement;

selectively compressing said compression and non-compression data segments to a different degree of compression in such a manner that some of said segments are not being compressed, some of said segments are being slightly compressed, and some of said segments are being heavily compressed; and selecting said at least one compression data segment using said location information of the traffic scene and decompressing only said at least one compression data segment representing said one designated area of the traffic scene, while discriminating against said at least one minimal or non-compression data segment representing said other designated area of the traffic scene.

2. A method as claimed in claim 1, wherein said data segments are separated from each other representing said data segments and labels identifying said data segment.

3. A method as claimed in claim 1, further comprising the step of reading stored location information of said data segments.

* * * * *